United States Patent Office 3,425,936
Patented Feb. 4, 1969

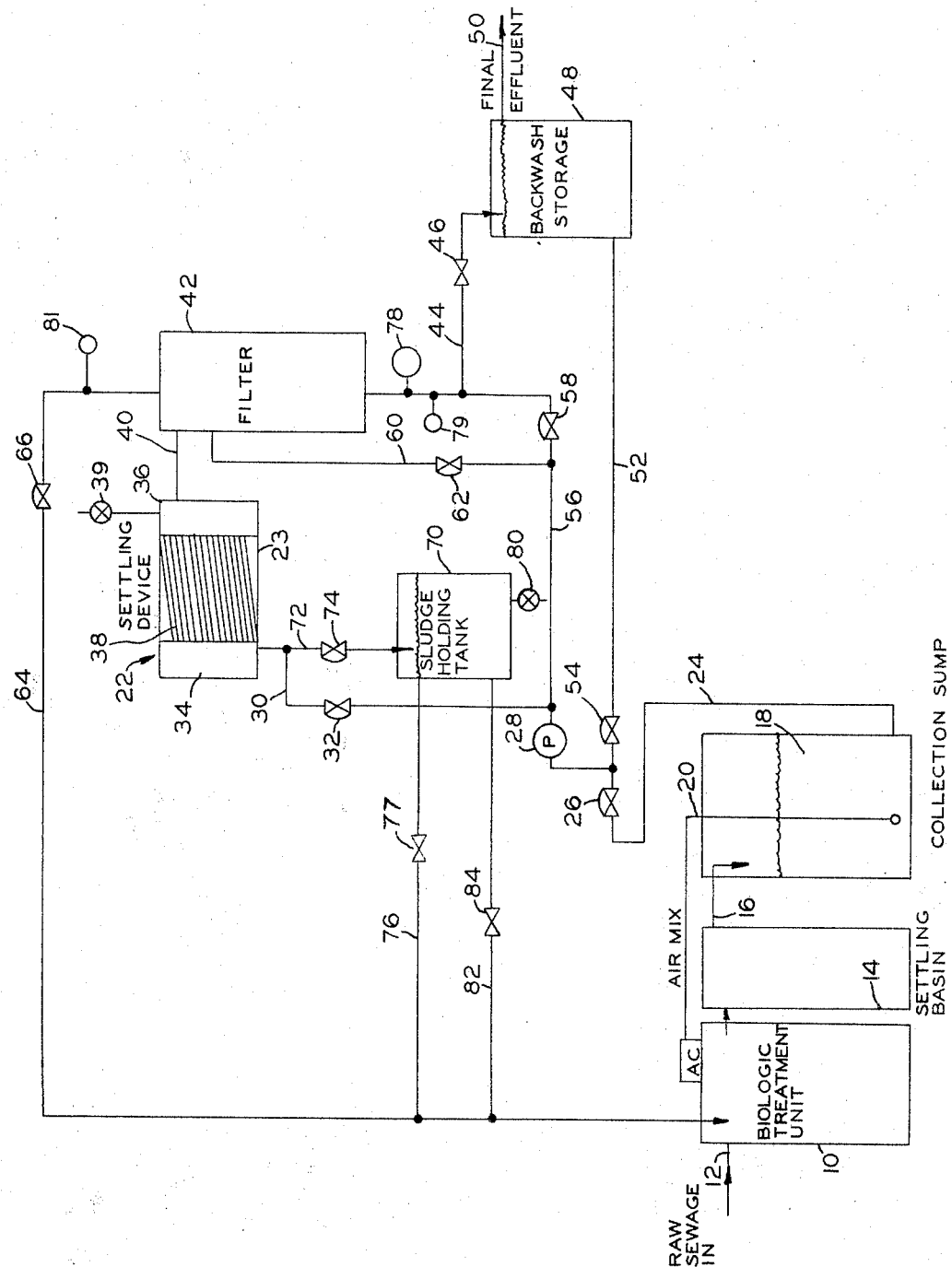

3,425,936
WASTE WATER TREATMENT SYSTEM
Gordon L. Culp, Robert D. Schilling, Sigurd P. Hansen, and Charles W. Botsford, Corvallis, Oreg., assignors to Neptune Microfloc, Incorporated, Corvallis, Oreg., a corporation of Oregon
Filed Mar. 2, 1967, Ser. No. 620,068
U.S. Cl. 210—8
Int. Cl. B01d 35/16
11 Claims

ABSTRACT OF THE DISCLOSURE

A treatment system for organic wastes in which the effluent from a biological oxidation process is passed through a settling device having a plurality of small tubes in parallel in which settleable material carried over in the effluent may deposit. The semi-clarified effluent from the settling device is then passed through a filter capable of removing substantially all of the remaining particulate material in the effluent so that the final effluent is of a clear quality. Automatic control arrangements are provided for backwashing the filter and returning the filter backwash to the biological process, and for draining the tubular settling device periodically so that excess biological solids are discharged to outside of the system and removed therefrom preventing upsets of the system.

BACKGROUND OF THE INVENTION

In aerobic biological treatment processes such as the activated sludge process, raw organic waste is aerated by either mechanical aeration devices or by the introduction of diffused air for aeration periods of 1 to 24 hours. During the aeration process, a biological floc is formed. The material in the aeration tank, a mixture of this floc and the waste being treated, is referred to as "mixed liquor" and the amount of floc present is measured by the quantity of "mixed liquor suspended solids" (MLSS) present. The majority of the MLSS are conventionally separated from the treated liquid by gravity sedimentation with the settled floc being returned to the aeration chamber by gravity or by mechanical means. The biological organisms responsible for stabilizing the organic matter found in the raw waste are a part of this floc and the return of this floc to the aeration chamber is necessary to maintain a biological population adequate for stabilization of the organic materials.

The quality of the final effluent from biological treatment processes such as the activated sludge process is dependent upon the performance of the final settling basin. Occasionally, the settling basin effluent contains large quantities of suspended solids as a result of surges in raw waste flow, failure of the settling basin sludge collection and return system, or an excessive accumulation of solids in the treatment system. A portion of the biological floc formed in the aeration process is inert material which cannot be degraded by further biological action. This inert material accumulates in the system and results in a gradual increase in the MLSS until the solids loading on the sedimentation unit becomes excessive and causes an upset of the sedimentation unit. This buildup of inert material can be prevented by periodic withdrawal and wasting of sludge from the system. However, close operational attention is required to maintain a proper program of sludge withdrawal. These problems are especially acute in the small plants which often do not receive adequate operation and maintenance. The discharge of large quantities of suspended solids may create nuisance conditions in the watercourse to which the effluent is discharged.

There is a definite need to control such solids losses in order to minimize water pollution and reduce hazards to public health. There is also a need in some areas to provide an effluent of higher quality than that ordinarily provided by a biological treatment process such as the activated sludge process even during periods of its optimum operation.

SUMMARY OF THE INVENTION

In the system of the present invention the waste is subjected to biological treatment, such as may be achieved in an aeration basin, and the effluent from the conventional settling basin used in association with the biological treatmet is passed through a settling device having a plurality of long, narrow tubes therein of such number that the waste flowing in each of the tubes assumes a streamline flow condition whereupon the large majority of any settleable material in the effluent will settle within the tubes. Effluent discharging from the tubes is passed through a filter capable of clarifying the liquid discharging from the settling device and the clarified effluent may then be discharged for further treatment or to a receiving watercourse. The system is provided with means for automatically backwashing the filter when the filter headloss reaches a predetermined point so that the efficiency of the filtration has been reduced to a predetermined amount or when the effluent from the filter carries excessive turbidity. At the same time, provision is made for draining the tubes in the settling device and discharging to outside of the system the sludge settling within such tubes. Such system thus provides means for preventing excessively rapid headloss buildup on the filter so that the filter runs are increased and also provides means for coping with and removing excessive quantities of sludge which may be discharged from the biological treatment system upon an upset condition therein whereupon the whole system may be operated more uniformly and returned to a normal condition rapidly in the event of an upset.

BRIEF DESCRIPTION OF THE DRAWING

The drawing is a schematic diagram of a waste treatment plant constructed in accordance with the present invention.

DETAILED DESCRIPTION

Indicated at 10 in the drawing is the biological treatment unit to which raw waste is fed by an inlet line 12. This unit may be an activated sludge plant or a unit using a modified process such as an extended aeration, contact aeration, contact stabilization, step aeration, tapered aeration, complete mixing, aerated lagoon, or oxidation ditch process. Provided in conjunction with the biologic treatment unit is a conventional gravity sedimentation basin 14 to which the aerated waste is passed and retained for a short period of time to permit the easily settleable solids to settle from the waste. The sedimentation basin effluent is passed through a conduit 16 to a collection sump 18 which is provided simply to accept surges in the flow of effluent resulting from surges in the feed of waste into the plant. Suitable agitating means may be provided in the sump such as an air agitator 20 to prevent settling of solid materials within the sump.

The liquid within the sump 18 is passed next to a supplemental solid separator or settling means 22 comprising a container 23 which may be sealed and operated under pressure or vented and operated at atmospheric pressure. In the system shown, a conduit 24 having a valve 26 therein leads from the sump 18 to the inlet of a pump 28, the outlet of which is connected by means of a conduit 30 through a valve 32 to the inlet plenum 34 of the settling means 22. The settling means also comprises an outlet plenum 36. Extending between the plenums are a plurality of tubes 38 of relatively small diameter (one to three inches), the total cross-sectional area of the tubes 38 being such that at a predetermined maximum flow rate of liquid through the plant the liquid in each of the tubes will assume a condition of streamline flow. Such a condition will be assumed if the liquid flow through each of the tubes will have a Reynolds number of less than about 100. The tubes 38 may be substantially horizontal but are preferably inclined upwardly from the inlet to the outlet plenum for a purpose to be described hereinafter. The inclination may be as much as 60° to the horizontal, but is preferably less than 45°. The tubes preferably have a length of between about three to ten feet. When sealed, a venting or air release valve 39 is positioned at the top of the container 23 over the outlet plenum 36. Such a settling device is more completely described in pending application Ser. No. 533,401, filed May 27, 1966, now abandoned.

The effluent discharging into the outlet plenum 36 is led through a conduit 40 to a filter 42 comprising a vessel containing filter media preferably graded from coarse to fine in the direction of flow through the filter. A preferred form of filter is constructed as described in pending application Ser. No. 345,204, filed Feb. 17, 1964, now U.S. Patent No. 3,343,680. Such a filter comprises media of at least three different specific gravities with the particles of heaviest gravity of the finest mesh size, the particles of intermediate specific gravity of intermediate size, and the particles of least specific gravity of the largest particle size. The particles are, however, intermixed in the bed so as to provide a substantially continually increasing number of particles in the downward direction. A suitable filter may comprise, for example, a bed having a depth of about 24 inches and comprising between about 70 to 30 percent by weight garnet particles of between about −40 +100 U.S. mesh size; between about 7 to 35 percent by weight graphitic rock of between about −20+50 U.S. mesh size; and, between about 30 to 65 percent by weight of anthracite of between about −10+20 U.S. mesh size. Such a filter will accept effluent at flow rates up to about 10 g.p.m./sq. ft. However, where high clarity effluent is not required or where lower filter rates are acceptable a filter composed entirely of one material could be utilized.

The effluent discharging from the filter is led through a conduit 44 having a flow control valve 46 therein to a storage tank 48 from which effluent may be discharged through a line 50 to a receiving watercourse or other receiving body or device. The backwash storage tank 48 is connected through a conduit 52 having a valve 54 therein to the inlet of the pump 28. The outlet of the pump 28 is connected to the bottom of the filter vessel 42 through a conduit 56 having a valve 58 therein. The outlet of the pump 28 is also connected to the upper portion of the vessel 42 through a conduit 60 having a valve 62 therein. A conduit 64 having a valve 66 therein is provided to convey liquid from the upper end of the filter vessel 42 to the aeration tank 10.

A sludge holding tank 70 may be provided to receive sludge which is discharged from the settling means 22, a drain line 72 having a valve 74 therein being provided in the bottom of the inlet plenum 34 to drain sludge into the sludge holding tank 70. A conduit 76 is connected to the sludge holding tank 70 near the top thereof to drain excess effluent and return the same to the aeration tank 10. An automatic valve 77 may be placed in line 76 and controlled in such a manner that the contents of tank 70 are allowed to settle for a given time after each discharge to the tank 70. This allows a minimum of excess settleable material to be returned to the aeration tank.

During the period of filtering of effluent discharging from the biological treatment plant, the valves 26, 32 and 46 are open whereas the remainder of the valves of the system are closed. The pump 28 thus withdraws the effluent from the collection sump 18 and passes it to the inlet plenum 34 of the settling device 22. The liquid carrying the effluent then flows through the tubes 38 to the outlet plenum 36. During the course of the flow through the tubes 38, a substantial proportion of the biological floc contained within the effluent and other settleable material in the effluent will settle upon the bottom of the tubes so that only a minor proportion of settleable material will be carried over to the discharge plenum 36 and thence through the conduit 40 to the filter 42. It is necessary, if economical filter runs are to be obtained during periods when large quantities of suspended solids are found in the effluent discharging from the plant 10, to remove such solids prior to passing the same through the filter 42. The settling device 22 is a valuable adjunct in such respect. For example, in an upset condition in an aeration plant the effluent discharging from the settling basin thereof may have a solids content of up to 3,000 mg./l. If such a loading is fed directly upon a filter, the filter run will be only about ten minutes before the filter has a breakthrough of turbid material or the headloss becomes excessive. By feeding such effluent first through a settling basin 22 at a feed rate of between 2.5–5 gals. per minute per foot square of cross-sectional area, about two-thirds of the suspended solids may be removed and the filter run increased to over an hour.

A turbidity measuring device 78 may be provided in the discharge line 44 from the filter 42, and pressure responsive devices 79, 81 may also be provided in the discharge line 44 and backwash line 64 to determine when headloss across the filter becomes excessive. Such devices are connected through a conventional control circuit so that when either filter effluent turbidity reaches an undesirably high value or when the headloss across the filter reaches an undesirably high value, the filter 42 is automatically backwashed and the settled solids in the supplemental solids separation device 22 are drained therefrom. To accomplish this action the valves 26 and 32 are closed and valves 54, 62 and 66 are opened so that the top portion of the filter bed 42 is backwashed. The valve 46 may be closed also at this point but may also be left open since the pressure drop through the line 44 will minimize the recirculation through such line. Simultaneously valve 74 and air release valve 39 are opened. After a predetermined interval the valve 58 is opened and backwash water then pumps through the filter and outwardly through the drain line 64 so that the solids within the filter are returned to the aeration basin 10. Opening of the valve 74 and the air release valve 39 permits the liquid within the settling device to drain into the sludge holding tank. As the liquid surface falls beneath the inlet ends of the tubes 38 the liquid therein will drain therefrom and because of the downward slope of the tubes towards such inlet ends the solids deposited in the bottom thereof will drain out of the tubes and to the bottom of inlet plenum 34 thus to be carried out of the device through the line 72 to the sludge holding tank 70. The overflow in the sludge tank 70 is returned through the line 76 to the biological treatment units 10. As necessary, sludge in the tank 70 is drained out for suitable disposal through a valve 80. The material returned from the filter 42 through the conduit 64 aids in maintaining the biological activity at high level but at the same time it does not return to the system such a large bulk of solids as to upset the same. After a predetermined length of backwash, valves 66 and 74 close so that the backwash water leaving the filter enters and fills the settling device with the displaced air escaping through air release valve 39. After the settling device is filled, valves 54, 58 and 62 close and valves 26 and 32 opening and normal filtration resumes.

The periodic removal of the collected solids in the settling device 22 enables their removal from the system so that the MLSS do not reach such a level as to cause an upset of the entire system. The provision of means for backwashing the filter when the load thereon reaches the desirable limit eliminates the need for any human judgment on the frequency of sludge withdrawal or the amount of sludge to be withdrawn from a system. Instead, in the operation of the system of the invention, when an excessive solids concentration is reached, the majority of the solids which will then be flowing from the conventional settling basin to the settling means 22 will be captured in the settling device and automatically be removed from the system. Means in the form of a conduit 82 having a valve 84 therein may be provided from the lower portion of the sludge holding tank 70 to the aeration basin 10 to enable return of sludge per se, at the operator's discretion, to the aeration basin 10. This will be desirable in instances where the biological treatment plant sludge collection and return system has been inoperative for a relatively long period of time, and will enable the proper MLSS level to be quickly re-established in the aeration tank so that the biological oxidation will proceed with maximum efficiency. The time of several days, normally required to rebuild the MLSS concentration and return the efficiency of the biological process normally required after shutdown for a lengthy period of time would be eliminated.

The use of a mixed media filter bed of the type described is desirable in providing maximum clarity in the water which is discharged from the system and, of course, it will improve the efficiency of any disinfection by chlorination which may be carried out upon the effluent thus further reducing any hazards to public health.

Because of the control over the solids disposal and the maintenance of efficient oxidation the process of the invention may enable a reduction in the aeration time.

Having illustrated and described certain preferred embodiments of the invention it should be apparent that the invention permits of modification in arrangement and detail. We claim all such arragements as come within the scope and purview of the appended claims.

We claim:

1. A process for the treatment of organic wastes comprising:
   subjecting the waste to biological treatment to form a biological floc therein;
   passing the oxidized waste through a plurality of elongated conduits of small cross-sectional area at such a velocity that the waste flowing in each of said conduits assumes a streamline flow to facilitate depositing on the bottom of said conduits the settleable material in said wastes, said conduits being disposed such that the longitudinal axes thereof are positioned at an angle to the horizontal of between about zero degrees and sixty degrees upwardly in the direction of flow; and
   collecting and passing the effluent from said conduits through a filter bed.

2. A process as set forth in claim 1 wherein:
   said settling means comprises means defining a pair of plenums, one at the inlet ends of said conduits and one at the outlet ends thereof; and
   periodically draining the plenum at the inlet end of said conduits to effect reverse flow through said conduits and draining therefrom of the material settled therein thus removing excess biological sludge from the system.

3. A process as set forth in claim 1 wherein:
   said filter bed comprises particles grading from coarse to fine in the direction of flow,
   said particles ranging in size from about 10 U.S. mesh size to about 100 U.S. mesh size.

4. A process as set forth in claim 3 wherein periodically said filter bed is backwashed and the backwash returned to said biological treatment process.

5. Apparatus for the treatment of the effluent from a biological waste treatment means operated so as to form a biological floc in said waste and a gravity sedimentation basin for receiving waste from said biological waste treatment means and retaining the waste therein for a short period of time to permit the easily settleable solids to settle from waste; said apparatus comprising a settling means comprising a plurality of elongated conduits of small diameter for receiving the effluent from said sedimentation basin and between which conduits the flow of said effluent is divided, said conduits being of such total cross-section that the effluent flowing in each of said conduits assumes a streamline flow condition to facilitate depositing on the bottom of said conduits the settleable material in said waste, said conduits being disposed such that the longitudinal axes thereof are positioned at an angle to the horizontal of between about zero degrees and sixty degrees upwardly in the direction of flow; and a filter bed for receiving the effluent discharging from said conduits.

6. Apparatus as set forth in claim 5 comprising means for introducing water beneath said filter bed to backwash the same; and conduit means for conveying the backwash water emerging from said bed to said biological treatment means.

7. Apparatus as set forth in claim 5 including:
   a storage tank for receiving at least a portion of the effluent discharging from said filter bed,
   means for passing water from said storage tank upwardly through said filter bed to backwash the same, and
   means for conveying said backwash water from said filter to said biological treatment process.

8. Apparatus as set forth in claim 5 wherein said settling means comprises an inlet plenum for receiving said biologically oxidized effluent from said sedimentation basin, said conduits each having an inlet end in communication with said inlet plenum, and an outlet plenum for receiving the effluent discharging from said conduits, said conduits being inclined upwardly from said inlet plenum to said outlet plenum at an angle to the horizontal less than about 45 degrees, drain means in the bottom of said inlet plenum operable between a closed position and an open position whereby opening of said drain means effects draining of the liquid in said inlet plenum and draining of the settled material in said tubes into said inlet plenum and thence through said drain means thus enabling periodic removal of excess biological sludge from the system.

9. Apparatus as set forth in claim 8 including:
   a tank for receiving material discharging from said drain means, and
   conduit means connected to said tank at a predetermined elevation for returning to said biological treatment means a portion of the effluent discharging from said inlet plenum.

10. Apparatus for the treatment of sewage comprising:
    means for subjecting organic wastes to biological treatment so as to form a biological floc in said waste;
    a gravity sedimentation basin for receiving waste from said biological treatment means and retaining the waste therein for a short period of time to permit the easily settleable solids to settle from said waste;
    means for conveying waste from said biological treatment means to said sedimentation basin;
    a settling means comprising a sealed container having means defining therein in horizontally spaced apart relation an inlet plenum and an outlet plenum and a plurality of tubes extending between said plenums in communication therewith, said tubes being inclined at a slight angle upwardly from said inlet to said outlet plenum;

each of said tubes being of relatively small diameter and being relatively long and of total cross-section such that when the total, predetermined flow through said apparatus is divided between said conduits the fluid flowing in each of said conduits assumes a streamline flow condition thus to facilitate depositing on the bottom of said conduits the settleable material carried in such fluid;

drain means connected with said inlet plenum for draining liquid from the bottom thereof, said drain means including a first valve means operable between an open and closed position;

a sludge holding tank for receiving fluid draining from said drain means;

vent means in the upper portion of said container for venting the same;

conduit means for conveying waste from said sedimentation basin to said inlet plenum, said conduit means including a second valve means and a third valve means and a pump positioned between said second and third valve means for pumping liquid in the direction from said sedimentation basin to said container;

conduit means connected with said sludge holding tank at an upper portion thereof for conveying liquid from said sludge holding tank to said biological treatment means;

filter means including a sealed container having therein a bed of particles grading from coarse to fine in the downward direction;

a storage tank for receiving water passing through said filter means;

a conduit having a fourth valve means therein for conveying water from said filter means to said storage tank;

a conduit means including a fifth valve means therein connected between said storage tank and the inlet of said pump, a conduit means including a sixth valve means connected between the outlet of said pump and the bottom of said container, and a conduit means including a seventh valve means connected between the top of said container and said biological treatment means, whereby with said second, third and fourth valve means open and said first, fifth, sixth and seventh valve means closed said waste flows from said sedimentation basin through said settling means and filter means to said storage tank, and with said second, third and fourth valve means closed and said fifth, sixth and seventh valve means open water flows reversely through said filter to backwash the same, and with said second, third and fourth valve means closed and said vent means and said first valve means open, the liquid within said container will flow through said drain means to said sludge holding tank whereupon deposited material within said tubes will drain therefrom into said inlet plenum and thence through said drain means.

11. Apparatus for removing settleable materials from a liquid comprising:

a settling means comprising a container having means defining therein in horizontally spaced apart relation an inlet plenum and an outlet plenum and a plurality of conduits extending between said plenums in communication therewith, said conduits being inclined at a slight angle upwardly from said inlet to said outlet plenum;

each of said conduits being of relatively small diameter and being relatively long and of total cross-section such that when the total, predetermined flow through said apparatus is divided between said conduits the fluid flowing in each of said conduits assumes a streamline flow condition thus to facilitate depositing on the bottom of said conduits the settleable material carried in such fluid;

drain means connected with said inlet plenum for draining liquid from the bottom thereof, said drain means including a first valve means operable between an open and closed position;

filter means including a sealed container having therein a bed of particles grading from coarse to fine in the direction of flow;

a storage tank for receiving liquid passing through said filter means;

sensing means operatively connected to said filter means for sensing the loading of said filter to a predetermined amount and for generating a signal thereupon; and means responsive to said sensing means signal for opening said first valve to drain said container and for simultaneously causing liquid to flow from said storage tank upwardly through said filter means to backwash the same, and, after a predetermined period of time, to close said first valve means and direct backwash liquid from said filter to said container until said container is filled and thereupon to cease said backwash.

References Cited

UNITED STATES PATENTS

| | | | |
|---|---|---|---|
| 3,171,804 | 3/1965 | Rice | 210—53 |
| 3,269,542 | 8/1966 | Renzi et al. | 210—17 X |

FOREIGN PATENTS

| | | |
|---|---|---|
| 746,980 | 3/1956 | Great Britain. |

MICHAEL E. ROGERS, *Primary Examiner.*

U.S. Cl. X.R.

210—73, 108, 196, 259, 521